United States Patent Office 3,436,807
Patented Apr. 8, 1969

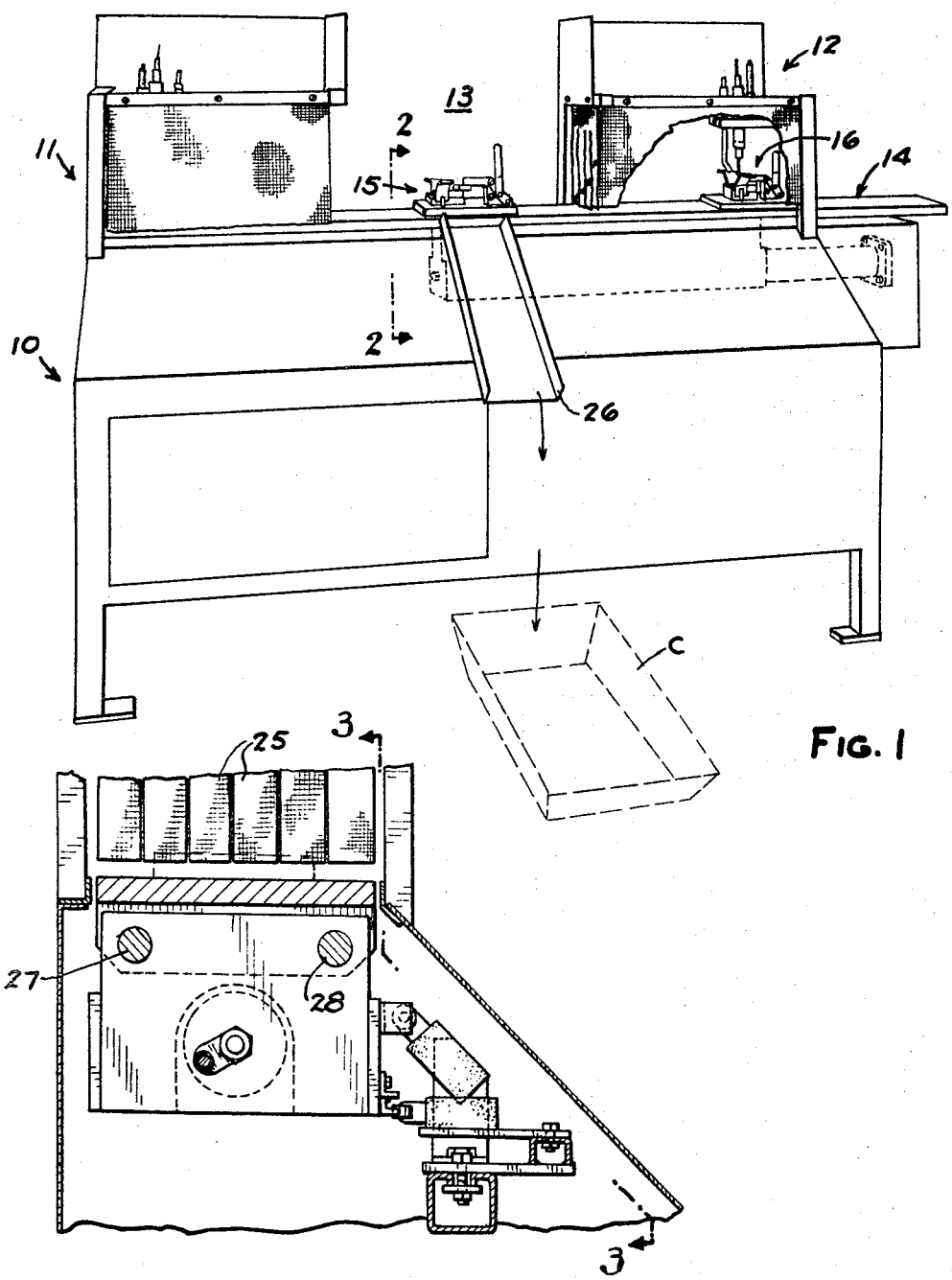

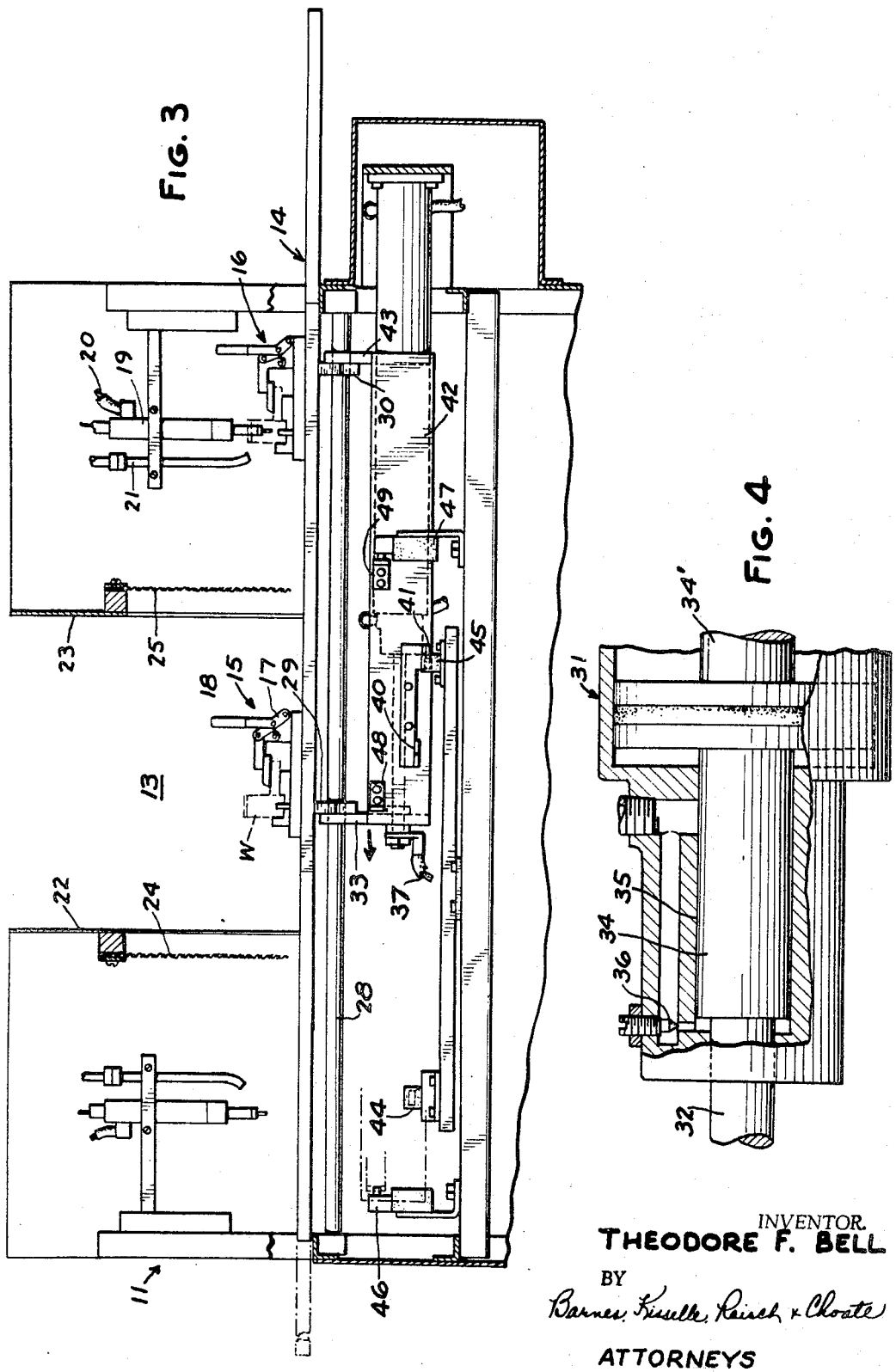

3,436,807
WELDING, BRAZING AND SOLDERING
METHOD AND APPARATUS
Theodore F. Bell, 22813 Dequindre,
Hazel Park, Mich. 48030
Filed Mar. 19, 1965, Ser. No. 441,228
Int. Cl. B23k 31/02, 5/22
U.S. Cl. 29—493           8 Claims

ABSTRACT OF THE DISCLOSURE

The method and apparatus disclosed herein comprises utilizing a reciprocating work table on which a first workpiece is loaded in one position at a loading station. The work table is then moved to bring the first workpiece to a first work station and a second workpiece is then loaded on the table at the loading station. The table is returned after the work is performed on the first workpiece to bring the first workpiece to the loading station and simultaneously move the second workpiece to a second spaced work station. The first workpiece is then unloaded and a third workpiece is loaded on the table in place of the first workpiece.

---

This invention relates to welding, brazing, soldering and light machining and particularly to the handling of workpieces in order to perform such operations thereon.

In the performing of welding, brazing, soldering and light machining operations, it is common practice to provide a work support which is loaded by an operator and then moved to a work station where the work operation is performed. The work support is then returned to the operator for unloading and reloading another workpiece. It has heretofore been suggested to provide a reciprocating work table with a pair of work supports thereon and a work station intermediate the ends of the work table with two operators positioned one at each end of the work table. In this arrangement when the work table is reciprocated to bring the one work support to the work station one operator can unload and load the other work support and when the work table is reciprocated to bring the other work support adjacent the work station, the other operator can unload and load the one support.

It is an object of the invention to provide a method and apparatus for handling workpieces which utilize a single operator and result in a high-speed performance of the work operations.

It is a further object of the invention to provide the method and apparatus which is rapid, efficient and low in cost.

In the drawings:

FIG. 1 is a fragmentary perspective view of the apparatus embodying the invention.

FIG. 2 is a fragmentary sectional view on an enlarged scale taken along the line 2—2 in FIG. 1.

FIG. 3 is a fragmentary sectional view taken along the line 3—3 of FIG. 2.

FIG. 4 is a fragmentary longitudinal sectional view of a cylinder utilized in the apparatus.

Referring to FIG. 1, the apparatus comprises a frame 10 on which a pair of spaced work stations 11, 12 are provided so that the central area 13 between work stations 11, 12 defines a work unloading and loading station, as presently described. A work supporting table 14 is mounted for horizontal reciprocating movement on the frame 10. A pair of work supports or fixtures 15, 16 are mounted in spaced relation on the table 14. The distance between the fixtures 15, 16 is such that when the table 14 is reciprocated to bring the work support 15 into position for performance of an operation at work station 11, the work support 16 is adjacent the unloading and loading station 13 so that an operator can unload a workpiece and load another workpiece thereon. When the work table 14 is reciprocated to bring the work support 16 into position at the work station 12, the work support 15 is at the unloading and loading station 13 where the operator can unload the workpiece on which the work operation has been performed and load another workpiece on the work support 15.

As shown in FIG. 3, the work supports 15, 16 can comprise toggle clamps 17 which are operated by a handle 18 to clamp a workpiece W in position.

Each of the work stations 11, 12 can be adapted for performing welding, brazing, soldering or light machining operations. As shown in FIGS. 1 and 3, the apparatus within the station 11, 12 comprises a wire guide 19 to which a cable 20 is connected for application of electrical power and a gas tube 21 for supplying inert gas to shield the wire at the work area. Thus, at the appropriate time during the cycle when the workpiece is being moved within a work station 11, 12 electrical power can be applied, welding wire can be fed, and an inert gas can be fed to perform a welding operation. The apparatus for controlling the electrical power, feeding the welding wire and applying the inert gas can be of conventional construction and apart from the initiating control, as presently described, forms no part of the present invention.

A housing 22, 23 is provided around each work station 11, 12 and a ribboned curtain 24, 25, respectively, seals the work area from the central unloading and loading station 13.

As shown in FIG. 1, a chute 26 is provided whereby the operator can take completed workpieces and place them on the chute 26 where they are guided to a container C.

Referring to FIGS. 2 and 3, the work table 14 is generally flat and supported for a reciprocating movement on spaced rods 27, 28 by downwardly extending brackets 29, 30. The table is reciprocated by means of a hydraulic cylinder 31 which has its piston 32 connected to a plate 33 extending downwardly from bracket 29. Upon application of hydraulic fluid to the cylinder, table 14 is reciprocated.

In order to provide for rapid movement to the work station and thereafter slow movement of the workpiece through the work station, appropriate means are provided in connection with the cylinder 31 and as shown in FIG. 4. Specifically, an enlarged portion 34, 34' is provided on each end of the piston 32. Each portion 34 enters a reduced cylindrical portion 35 during the terminal portion of the stroke of the piston rod 32 as the work support reaches the work station. The exhaust of fluid is thus restricted through a needle valve 36 thereby decelerating the piston. A similar construction is provided at the other end of the piston rod to decelerate the piston when the work table moves in the opposite direction and the other work support reaches the other work station.

As shown in FIG. 3, an electrical cable 37 is provided on the plate 33 where the work to be performed is a welding operation.

Cams 40, 41 are provided upon a cam plate 42 mounted between vertical plate 33 and a plate 43 on bracket 30. The cams 40, 41 are adapted to actuate switches 44, 45, respectively, to initiate the welding operation as each work support reaches its respective work station.

The switches 44, 45 control the work operation by initiating the work cycle and may also stop the work cycle when the work table moves away from the switches.

In order to reverse the operation of the cylinder 31, switches 46, 47 are provided adjacent each end of the stroke of the piston and are adapted to be actuated by cams 48, 49 on the plate 42 to reverse the flow of hydraulic fluid to the cylinder 31. The specific mechanism for reversing the flow of the cylinder 31 is conventional and forms no part of the present invention apart from the initiating switches 44, 45.

In operation, initially one of the work supports 15 is adjacent the unloading and loading station 13 (FIG. 3). The operator then loads a workpiece on work support 15 as shown in FIG. 3 and initiates the operation of the apparatus starting the pump which supplies fluid to the ciylinder 31. The table 14 is thus moved to bring the work support 15 in position adjacent the work station 11. As the work support 15 approaches the work station 11, cam 40 engages switch 44 to initiate the welding operation. At the same time, the enlarged end 34 of piston 32 enters the cylinder portion 35 reducing the speed of movement of the work table 14 so that the work support 15 moves through the work operation at a reduced rate. While the workpiece and work support 15 are moving slowly in the work station 11, the work support 16 has reached the unloading and loading station 13 where the operator places another workpiece on the work support 16. As the cam 48 approaches and engages the switch 46, the flow of hydraulic fluid to the cylinder 31 is reversed and the work table 14 is rapidly reciprocated in the opposite direction.

As the work table 14 approaches a position wherein it brings the work support 16 to work station 12, the cam 41 engages the switch 45 to initiate the second work operation. At the same time, the speed of the cylinder is reduced because of engagement of the enlarged portion 34' with the cylindrical portion (not shown) of the cylinder. The workpiece on work support 16 is then moved slowly through the work operation and finally the cam 49 engages the switch 47 to reverse the flow of hydraulic fluid to the cylinder. While the work support 16 is at the work station 11, the work support 15 is moved into position at the unloading and loading station 13 where the operator unloads the workpiece on which the work operation had been performed and loads another workpiece into position.

The operation of the apparatus thereafter continues automatically and the operator need only load and unload at the single unloading and loading station 13.

It can thus be seen that there has been provided a method and apparatus for performing welding, soldering, brazing and other similar light machining operations efficiently and quickly with the use of a single operator.

I claim:

1. In the welding, brazing, soldering and the like, the steps comprising
   utilizing a reciprocating work table,
   loading a first workpiece in one position on the work table at a loading station,
   moving the table to bring said first workpiece to a first work station spaced from said loading station,
   loading a second workpiece on the table at said loading station,
   returning the table by a reciprocating movement to bring said first workpiece to said loading station and thereby simultaneously move said second workpiece to a second longitudinally spaced work station,
   unloading said first workpiece,
   and reloading a third workpiece on said table at said work loading station in place of said first workpiece.

2. In the welding, brazing, soldering and the like, the steps comprising
   utilizing a reciprocating work table,
   loading a first workpiece in one position on the work table at a loading station,
   rapidly moving the table to bring said first workpiece to a first work station,
   slowly moving said work table to move said first workpiece through said first work station,
   loading a second workpiece on the table at said loading station,
   rapidly returning the table by a reciprocating movement to bring said first workpiece to said loading station and thereby simultaneously move said second workpiece to a second spaced work station,
   slowly moving said work table to move said second workpiece through said second work station,
   unloading said first workpiece,
   and reloading a third workpiece on said table at said work loading station in the place of said first workpiece.

3. In the welding, brazing, soldering and the like, the steps comprising
   utilizing a reciprocating work table,
   loading a first workpiece in one position on the work table at a loading station,
   rapidly moving the table to bring said first workpiece to a first work station,
   initiating the working operation when the first workpiece reaches said first work station,
   thereafter slowly moving said workpiece through said first station,
   loading a second workpiece on the table at said loading station,
   rapidly returning the table by a reciprocating movement to bring said first workpiece to said loading station and thereby simultaneously move said second workpiece to a second spaced work station,
   initiating the working operation when the second workpiece reaches said second work station,
   thereafter slowly moving said workpiece through said second work station,
   and unloading said first workpiece,
   and reloading a third workpiece on said table at said work loading station in the place of said first workpiece.

4. An apparatus for welding, brazing, soldering and the like comprising
   a work table,
   means for mounting said work table for reciprocating movement,
   a pair of longitudinally spaced work supports on said table,
   a pair of longitudinally spaced work stations positioned adjacent the path of said table such that when the table is in position to bring one said work support adjacent a first work station the other said support is adjacent a work loading station and when said table is reciprocated to move the other said support to a second work station said first support is at the work loading station,
   and single means for reciprocating said working table.

5. The combination set forth in claim 4 including means for controlling the movement of said working table such that the table moves rapidly to and from the work stations and slowly through the work stations.

6. The combination set forth in claim 4 including means for initiating the reciprocating movement of said work table.

7. An apparatus for welding, brazing, soldering and the like comprising
   a work table,
   means for mounting said work table for reciprocating movement,
   a pair of longitudinally spaced work supports on said table,
   a pair of longitudinally spaced work stations positioned adjacent the path of said table such that when the table is in position to bring one said work support adjacent a first work station the other said support is adjacent a second work load station and when said table is reciprocated to move said other support to a second work station said first support is at the work loading station, single means for reciprocating said working table,
means for controlling the movement of said working table such that said work table moves rapidly to and from the work stations and slowly moving said table through the work stations,
means for initiating the working operation as each work support reaches its respective station,
and means for terminating said working operation after each work support has moved through its respective station sufficiently to perform the desired operation on the workpiece.

8. An apparatus for welding, brazing, soldering and the like comprising
a work table,
a pair of horizontally extending rods,
means for mounting said work table on said rods for reciprocating movement,
a pair of longitudinally spaced work supports on said table,
a pair of longitudinally spaced work stations positioned adjacent the path of said table such that when the table is in position to bring one said work support adjacent a first work station the other said support is adjacent a work loading station and when said table is reciprocated to move the other said support to a second work station said first support is at the work loading station,
single means for reciprocating said working table,
means for controlling the movement of said work table such that said work table moves rapidly to and from the work stations and slowly moving said table through the work stations,
means for initiating the working operation as each work support reaches its respective station,
and means for terminating said working operation after each work support has moved through its respective station sufficiently to perform the desired operation on the workpiece.

References Cited

UNITED STATES PATENTS

| | | | |
|---|---|---|---|
| 2,776,640 | 1/1957 | Miklofsky et al. | 228—36 |
| 3,138,860 | 6/1964 | Meshew | 228—58 |
| 3,230,608 | 1/1966 | Adams et al. | 29—629 |

WILLIAM I. BROOKS, *Primary Examiner.*

U.S. Cl. X.R.

29—484; 228—47